United States Patent [19]

Schneider et al.

[11] Patent Number: 5,830,425
[45] Date of Patent: Nov. 3, 1998

[54] CHROMIUM-FREE CATALYST BASED ON IRON OXIDE FOR CONVERSION OF CARBON MONOXIDE

[75] Inventors: Michael Schneider, Ottobrunn; Karl Kochloefl, Rosenheim; Gerd J. Maletz, Bruckmuehl; Jurgen Ladebeck, Bad Aibling; Christoph Heinisch, Feldkirchen/Westerham, all of Germany

[73] Assignee: Sud-Chemie AG, Deutschland, Germany

[21] Appl. No.: 766,391

[22] Filed: Dec. 12, 1996

Related U.S. Application Data

[63] Continuation of Ser. No. 319,625, Oct. 7, 1994, abandoned.

[30] Foreign Application Priority Data

Feb. 9, 1993 [DE] Germany .................. 43 03 715.1

[51] Int. Cl.$^6$ .................................................. C01B 31/20
[52] U.S. Cl. ................ 423/437.2; 423/655; 423/656; 502/302; 502/303; 502/304; 502/331; 502/338; 502/345; 502/349
[58] Field of Search .................. 423/655, 656, 423/437.2; 502/302, 303, 304, 331, 338, 345, 349

[56] References Cited

U.S. PATENT DOCUMENTS

| | | |
|---|---|---|
| 3,759,825 | 9/1973 | Chun et al. . |
| 3,905,918 | 9/1975 | Mai et al. . |
| 3,957,691 | 5/1976 | Adachi et al. . |
| 4,540,563 | 9/1985 | Chinchen . |
| 4,835,132 | 5/1989 | Sambrook . |
| 4,916,105 | 4/1990 | Rieck et al. . |

FOREIGN PATENT DOCUMENTS

| | | |
|---|---|---|
| 62410 | 10/1982 | European Pat. Off. . |
| 234745 | 9/1987 | European Pat. Off. . |
| 385123 | 9/1990 | European Pat. Off. . |

*Primary Examiner*—Steven Bos
*Assistant Examiner*—Thomas G. Dunn, Jr.
*Attorney, Agent, or Firm*—Scott R. Cox

[57] ABSTRACT

The invention relates to a catalyst for conversion of carbon monoxide with steam into hydrogen, carbon dioxide and hydrogen-rich synthesis gases. The conversion can be done at temperatures above roughly 300° C. In addition, a chromium-free catalyst for the aforementioned purpose is described which contains the following in "application form:"

(a) 30–98% by weight iron oxide, computed as $Fe_2O_3$;
(b) 0.1–20% by weight copper oxide, computed as CuO;
(c) 0.1–20% by weight of an oxide of the rare earth levels computed as $Me_2O_3$ (in which Me is a rare earth metal) and/or zirconium oxide, computed as $ZrO_2$;
(d) 0.1–30% by weight of at least one oxide of one or several other base metals with an ionic radius from 50 to 72 pm (other than chromium)
(e) 0–0.1% by weight of at least one oxide of one or several precious metals from the platinum group;
(f) 0–30% by weight barium oxide.

34 Claims, No Drawings

CHROMIUM-FREE CATALYST BASED ON IRON OXIDE FOR CONVERSION OF CARBON MONOXIDE

This is a continuation of application Ser. No. 08/319,625, filed on Oct. 7, 1994, now abandoned.

BACKGROUND OF INVENTION

The invention relates to a catalyst for conversion of carbon monoxide with steam into hydrogen and carbon dioxide. In particular the conversion can be done at temperatures above roughly 300° C. This conversion process has been referred to as "high temperature conversion" for the production of hydrogen or hydrogen-rich synthesis gases.

Usually iron oxide promoted with chromium oxide is used as the catalyst for high temperature conversions. As is known from the literature (David S. Newsome, *Catal. Rev.-SCI. Eng.* 21 (2), 275–318 (1980): G. C. Maiti, S. K. Gosh, *Ind. J. of Technol.* Vol. 19, 35–37 (January 1981)), a chromium oxide promotor combines two functions. On the one hand it is used to improve the catalytic activity; on the other it acts as a thermal stabilizer, i.e., it increases the thermal stability of the magnetite, the active form of the catalyst, and prevents too rapid deactivation under conditions of technical use.

Unfortunately, a health danger cannot be completely precluded when using chromium, especially in the hexavalent form, both in production and in later handling of the catalyst. In addition, the cost for ensuring worker safety, which cannot be underestimated, must be considered. At the same time, the used catalyst represents a danger to man and the environment and must be disposed of with due observation for environmental regulations which apply to special toxic waste.

EP-A-0 062 410 discloses catalysts known for the aforementioned utilization which avoids the aforementioned disadvantages by eliminating chromium oxide. Formulations are disclosed which, besides iron oxide, contain at least another oxide which is not reduced to metal more easily than trivalent chromium oxide. It is generally the oxide of a metal which has a valency of at least 2. However, the oxide is not capable of forming with the iron oxide a mixed oxide with spinel structure. The oxide is preferably an alkali metal such as calcium, strontium or barium, the rare earths, and zirconium or hafnium. Application examples with calcium oxide, cerium oxide and zirconium oxide however show that the activity of this catalyst is achieved solely in the case of the cerium oxide-containing catalyst, and then only under the assumption that the activity is referenced to the same iron content. In particular, the zirconium oxide-containing sample catalyst is clearly inferior to the conventional, chromium-containing catalyst with regard to catalytic activity. In addition, there is no disclosure on the thermal stability of the disclosed catalysts.

DE-C 2 245 607 relates to the use of catalysts of base metals and platinum group elements for purifying exhaust gases. The catalyst has a general formula

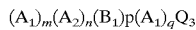

in which
 m or n can assume values of 0–1 and
 p or q can assume values >0 but <1
 and m+1=1 and p+q=1, with $a_1 = La^{3+}$, $a_2 = Sr^{2+}$, and/or $Ba^{2+}$
 $b_1 = Ni^{2+}$, $Co^{2+}$ and/or $Fe^{2+}$, $b_2 = Ru^{4+}$, $Ti^{4+}$ and/or $Mn^{4+}$
with the scale that
 $(m \cdot a_1) + (n \cdot a_2) + (p \cdot b_1) + (q \cdot b_2) = 6$
in which
 $a_1$ = valency of $A_1$
 $a_2$ = valency of $A_2$
 $b_1$ = valency of $B_1$
 $b_2$ = valency of $B_2$ This catalyst contains no copper which is important for the current catalyst, as in lower concentration it increases selectivity with respect to suppression of the formation of hydrocarbons. This problem did not exist in the catalyst according to DE-B-2 245 607 as this catalyst is not used for the conversion of carbon monoxide with steam into hydrogen and carbon dioxide, but only as an exhaust gas purification catalyst.

EP-A-0 234 745 relates to a CO conversion catalyst (shift catalyst) which represents the calcined form of a precursor of formula

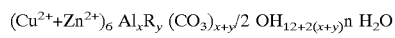

in which R is lanthanum, cerium or zirconium, x is not less than 1 and not more than 4; y is not less than 0.01 and not more than 1.5; n is roughly 4. The catalyst precursor has a layer structure and contains no iron.

EP-A-0 385 123 describes a catalyst for removing motor vehicle exhaust gases which on a carrier contains an effective amount of at least one metal from the platinum group and a metal ferrite for bonding of $H_2S^-$. The metal ferrite therefore has no catalytic function.

DE-A-2 333 816 describes a catalyst for treatment of exhaust gases from internal combustion engines which comprises a sintered material of iron oxide and at least one other metal oxide which has at least partially a spinel structure. It contains no oxide of the rare earth metals and is not used for conversion of carbon monoxide with steam into hydrogen and carbon dioxide.

U.S. Pat. No. 3,759,825 describes a copper oxide-iron oxide catalyst for conversion of thiols into disulfides. It contains no oxide of the rare earth metals and is not used for conversion of carbon monoxide with steam into hydrogen and carbon dioxide.

The object of this invention is to eliminate the aforementioned disadvantages, i.e., to make available catalysts for the described technical application, which on the one hand preclude any danger to man and the environment resulting from use of chromium oxide, and on the other are superior to chromium-containing catalysts with regard to catalytic activity and thermal stability.

SUMMARY OF INVENTION

This invention is directed to chromium-free catalysts which contain the following as effective components in the application form used:

(a) 30–98% by weight iron oxide, computed as $Fe_2O_3$;

(b) 0.1–20% by weight copper oxide, computed as $CuO$;

(c) 0.1–20% by weight of an oxide of a rare earth metal, computed as $Me_2O_3$ (in which Me is a rare earth metal) and/or zirconium oxide, computed as $ZrO_2$;

(d) 0.1–30% by weight of at least one oxide of the base metals with an ionic radius of 50 to 72 pm (picometers) (other than chromium);

(e) 0–0.1% by weight of at least one oxide of a precious metal from the platinum group; and (f) 0–30% by weight barium oxide.

DESCRIPTION OF THE INVENTION

The catalysts of this invention are chromium-free catalysts which contain the following:

(a) 30–98% by weight iron oxide, computed as $Fe_2O_3$;

(b) 0.1–20% by weight copper oxide, computed as CuO;

(c) 0.1–20% by weight of an oxide of a rare earth metal, computed as $Me_2O_3$ (in which Me is a rare earth metal) and/or zirconium oxide, computed as $ZrO_2$;

(d) 0.1–30% by weight of at least one oxide of one or more base metals with an ionic radius of 50 to 72 pm (picometers) other than chromium;

(e) 0–0.1% by weight of at least one oxide of a precious metal from the platinum group; and (f) 0–30% by weight barium oxide.

In this connection "chromium-free" means that in the production of the catalyst no chromium compound is used as a raw material. Chromium traces can be present, for example, in iron sulfate of technical purity and thus must be tolerated in the production of the catalysts according to the invention on a technical scale. Generally, however, the chromium content should be less than about 0.1% by weight.

"Application form" is defined as the precursor of the catalyst, as is present in the reactor, before the catalyst has reached its full effectiveness ("active form"). Usually the combination of all components is present when the reactor is filled or when the reaction has begun. But it is also possible to add some of the components in the reactor when the reaction has already begun. This alternative should also be subsumed under the term "application form."

The term "application form" was chosen because the composition of the combination in the "active form" cannot be precisely established and is dependent on the reaction conditions in the reactor, such as the temperature, pressure, the ratio between the feed materials and whether in the presence of a reducing or inert atmosphere. Thus, for example, the iron oxide can be present in the "active form" as $Fe_2O_3$ or $Fe_3O_4$ in mixtures of different composition. The corresponding applies to some of the oxides of components (b) through (e).

The copper oxide component (b) in small concentration causes an increase in selectivity such that unwanted secondary reactions which lead to formation of hydrocarbons are suppressed. Added in higher concentrations to the catalyst, the copper oxide in conjunction with a component from (d) causes an improvement of catalytic activity.

Component (c) is used like component (d) to improve thermal stability.

Component (d) is used as a stabilizing component. Based on the indicated ionic radii from 50 to 72 pm (picometers), the ions of these components are able to insert themselves more or less isomorphically into the iron oxide lattice (component a) and cause stabilization of the iron oxide lattice. Examples of suitable ions with the ionic radii are given below:

$Se^{4+}$=50 pm, $Al^{3+}$=51 pm, $Ge^{4+}$=53 pm, $Te^{6+}$=56 pm, $As^{3+}$=58 pm, $V^{5+}$=59 pm, $Mn^{4+}$=60 pm, $Ga^{3+}$=62 pm, $Sb^{5+}$=62 pm, $Mo^{6+}$=62 pm, $W^{6+}$=62 pm, $V^{4+}$=63 pm, $Co^{3+}$=63 pm, $Mg^{2+}$=66 pm, $Mn^{3+}$=66 pm, $Se^{1+}$=66 pm, $Li^+$=68 pm), $Ti^{4+}$=68 pm, $Ta^{5+}$=68 pm, $Ni^{2+}$=69 pm, $Nb^{5+}$=69 pm, $Te^{4+}$=70 pm, $Mo^{4+}$=70 pm, $W^{4+}$=70 pm, $Sn^{4+}$=71 pm, $Co^{2+}$=72 pm.

The precious metal component (e) is used optionally to activate the copper component.

The barium oxide component (f) is used to bind the sulfur which is often contained as an impurity in the iron oxide component. Under oxidizing conditions the sulfur, which initially is usually present as sulfide sulfur in the iron oxide, is converted into sulfate which is bound as barium sulfate.

The combination according to the invention can contain other components which are inert with respect to conversion of carbon monoxide with steam into hydrogen and carbon dioxide. This includes for example alpha-aluminum oxide. If the latter is added to the combination according to the invention and if it is present in a mechanical mixture, it is not an element of component (d). Other inert additives include, for example, mullite, cordierite, cement and other heat-resistant materials.

The contents of individual components are preferably as follows:

The iron oxide content (a) is about 50 to 95% by weight, preferably 80 to 95% by weight, The copper oxide content (b) is about 0.5 to 10% by weight, preferably 1 to 5% by weight, The content of rare earth oxide and/or zirconium oxide (c) is about 0.1 to 10% by weight, preferably 0.5 to 5% by weight, The content of the other base metal oxide (d) is about 0.2 to 15% by weight, preferably 0.5 to 10% by weight, The other base metal oxide (d) is preferably aluminum oxide, magnesium oxide, manganese oxide and/or molybdenum oxide, The barium oxide content (f) is about 0 to 10% by weight, preferably 0 to 5% by weight. The catalysts according to the invention can basically be produced according to any known method which ensure mixing of components which is intensive enough for catalytic application.

One process version is characterized by grinding oxides (a) through (d) and optionally (e) and (f) with one another in fine particulate form and then thermally treating the ground mixture, especially at temperatures from about 400° to 1000° C., preferably from 600° to 900° C., and pressing it into moldings.

Another process version is characterized by mixing the precursors which can be converted into oxides (a) through (d) and optionally (e) and (f) with one another and converting the mixture into the oxides by thermal treatment, especially at temperatures from about 400° to 1000° C., preferably from 600° to 900° C., and pressing them into moldings. In this process version hydroxides, hydroxocarbonates and/or carbonates are used as the precursors.

A third process version is characterized by separating the precursors of oxides (a) through (d) and optionally (e) and (f) from the solutions of their salts by joint or sequential precipitation in the form of insoluble precipitates and thermally treating the precipitates, optionally after pressing into moldings, for purposes of conversion into the oxides, especially at temperatures from about 400° to 1000° C., preferably from 600° to 900° C.

A fourth process version is characterized in that the iron oxide component (a), preferably in hydrated form, is impregnated with a solution of the salts of components (b) through (d) and optionally (e) and (f) and the resulting mixture, optionally after compression into moldings, is converted into the mixture of the corresponding oxides by thermal treatment, especially at temperatures from about 400° to 1000° C., preferably from 600° to 900° C.

For all process versions Fe(II) or Fe(III) compounds or their mixtures can be used as the iron oxide component (a)

or to produce the iron oxide component (a). In the fourth process version preferably goethite is used as the iron oxide component. If the goethite contains sulfur in the form of sulfide, barium oxide or a precursor of barium oxide is added as a sulfur scavenger.

For example, halides, sulfates or nitrates are suitable as soluble salts. Primarily alkali carbonates, hydrogen carbonates and hydroxides and the corresponding ammonium compounds are suitable as precipitation agents.

Known process can be used to form the catalyst compositions according to the invention. Preferred forming methods are tabletting and extrusion molding, the use of organic or inorganic auxiliary agents in the function of lubricants or to improve the plasticity during extrusion molding being recommended. The forming can be done both before and also after calcination.

Iron can be used in divalent or trivalent form. If the divalent form is used, care must be taken that oxidation to the trivalent stage can take place before, during or after production of the aforementioned intimate mixture of the oxides. Furthermore it must be ensured that the iron component can be converted into the active form, presumably $Fe_3O_4$, for example, by reduction using carbon monoxide at the beginning of the conversion reaction. On the other hand, it is necessary to oxidize the iron component, if it is present in the bivalent form, into the active form.

The copper component (b) is preferably used as copper oxide, hydroxycarbonate, hydroxide, sulfate or nitrate.

The rare earth component used preferably in component (c) can be used in the form of sulfate, nitrate or carbonate.

The zirconium component can be used for example in the form of acid zirconyl compounds, but also by hydrolysis of the basic ammonium zirconyl carbonate or as a finely divided oxide or sol. If sulfates are used as the starting material, it is advisable to largely remove the sulfate ions before calcination by washing.

The aluminum preferably used in component (d) can be used for example as sulfate, nitrate, as Na-aluminate, but also as finely divided hydroxide or oxide hydrate or sol.

Forming can be done before or after conversion of the catalyst mass into the oxide form. Optionally, in forming, additives are used which improve the formability or sliding property, as, for example, natural or synthetic graphite.

It can also be advantageous to incorporate one or several metal components only after forming, for example, by impregnation of the moldings with a solution which contains the pertinent metal component.

The subject of the invention is furthermore the process for the use of the described catalysts for conversion of carbon monoxide with water vapor into hydrogen and carbon dioxide. The catalysts according to the invention are effective in a wide temperature range. Preferably they are used for high temperature conversion at temperatures of about 200° to 600° C. The total pressure is normally between 1 and about 100 bar, in which the concentration of the carbon monoxide in the feed gas can vary depending on the technical process of producing the gas to be converted. Series connected processes can be, for example, steam reforming of hydrocarbons, coal gasification or methanol decomposition.

EXAMPLES

The effectiveness of the catalysts with respect to conversion of carbon monoxide with water vapor was demonstrated by routing a gas mixture consisting of 10% by volume carbon monoxide and 90% by volume hydrogen after introducing water vapor through an electrically heated reactor tube which contains the catalyst as bulk material. Beforehand the catalyst has been converted into the active form by passing a mixture of hydrogen and water vapor over it at the reaction temperature. The reactor was operated under largely isothermal conditions.

The CO concentration in the gas mixture was analyzed by gas chromatography before and after passing the layer of bulk catalyst material and the conversion X was determined according to $$X = (C^E - C^A)/C^E$$

$C^E$ standing for the CO feed concentration and $C^A$ standing for the volume-corrected CO output concentration.

The following reaction conditions were set:

Total pressure: 20 bar

Temperature: 350°, 370° C.

Space velocity: 7000 (dry gas)

$H_2O$/CO ratio: 10

Following this first measurement cycle the catalyst was subjected to accelerated thermal aging by treating it for 15 hours at 500° C. with the described mixture of CO, $H_2$ and water vapor. Then the conversion at 350° and 370° C. was determined again as described above (2nd cycle). The differences of the two measurement cycles provide information about the thermal stability of the catalyst sample.

The invention is illustrated by the following examples:

EXAMPLE 1

4508 g $Fe_2(SO_4)3$ dehydrated, 157 g $CuSO_4*5 H_2O$, 151 g basic zirconyl sulfate (33% $ZrO_2$) and 141 g $Al(NO_3)_3*9 H_2O$ are dissolved in 12 liters of desalinated water. With the addition of 252 g of $H_2SO_4$ (95%), the solution is heated to 60° C. Furthermore, 1700 g of caustic soda are dissolved in 13.5 liters $H_2O$ and likewise heated to 60° C. The sodium hydroxide solution was placed in a thermostat-equipped precipitation tank.

The solution of metal salts was metered into the tank by means of a hose pump while stirring until the slurry reaches a pH of 7–8. (Metering rate=200 ml/min). The temperature is set to 60° C.

Aging was done at this temperature for 4 hours while stirring. The slurry was refined during precipitation and aging with an air flow of 1.5 m³/h.

The slurry was filtered through a filter press and washed until the Na and S contents were at a maximum of 1000 ppm (relative to the product heated to 600° C.).

The filter cake was dried for 12 hours at 180° C. and then screen-granulated over a sieve with a mesh size of 1 mm. The granulate was calcined. In doing so heating took place at an increase in temperature of about 2° C./min to at least 600° C. and the temperature was held there for 12 hours.

The calcined granulate was pressed with the addition of 4% by weight synthetic graphite into cylindrical tablets to an average side crush strength of 70 N (D×H=4.5×4.5 mm). The side crush strength was determined using tablet testing device M4 from Schleuniger. The cylindrical molding with a length of 4.5 mm and a diameter of 4.5 mm is placed between the jaws of the device, in which pressure was exerted perpendicularly to the axis of the cylinder.

EXAMPLE A (COMPARISON)

This is a commercial conversion catalyst with a nominal $Fe_2O_3$ content of 80% by weight and 9% by weight $Cr_2O_3$ which was produced as follows: iron sulfate and sodium bichromate are dissolved in water and pumped into a solution of sodium hydroxide. During precipitation, oxidation with air took place.

After washing the precipitate, which has been filtered off, was dried, calcined and tabletted.

EXAMPLE B (COMPARISON)

4508 g $Fe_2(SO_4)_3$ dehydrated, 454 g basic zirconyl sulfate (with a $ZrO_2$ content of 33%), and 157 g of $CuSO_4*5H_2O$ are dissolved in 12 liters of $H_2O$ with the addition of 252 g $H_2SO_4$ (95%) and heated to 60° C. For one hour this solution was pumped at 60° C. into a solution of 3106 g NaOH in 13.5 liters $H_2O$. Subsequently, stirring continued for 4 hours at the same temperature. During the entire time an air flow of 1.5 m³/h was injected. Filtration took place through a filter press and washing was done with 500 liters of $H_2O$. At 180° C. drying continued for 12 hours. Then screen granulation to a grain size of less than 1 mm was done. The granulate was calcined; in doing so it is heated with 2° C./min increase in temperature to at least 600° C. and kept at this temperature for 12 hours.

The calcined granulate was formed into cylindrical tablets of format 4.5*4.5 mm with the addition of 4% graphite.

EXAMPLE C (COMPARISON)

4633 g $Fe_2(SO_4)_3$ dehydrated, 157 g $CuSO_4*5H_2O$ and 736 g $Al(NO_3)_3* 9 H_2O$ was dissolved in 12 liters of desalinated water and the solution was heated to 60° C. Precipitation and processing were done as described in example 1.

EXAMPLE 2

4508 g $Fe_2(SO_4)_3$ dehydrated, 157 g $CuSO_4* 5H_2O$, 736 g $Al(NO_3)_3·9 H_2O$ and 97 g $Ce(SO_4)_2$ was dissolved in 12 liters of desalinated water and the solution was heated to 60° C. Furthermore, 2000 g of caustic soda was dissolved in 13.5 liters of $H_2O$ and likewise heated to 60° C. The sodium hydroxide solution was placed in a thermostat-equipped precipitation tank. Precipitation and processing were done as described in example 1.

EXAMPLE 3

4508 g $Fe_2(SO_4)_3$ dehydrated, 157 g $CuSO_4·5H_2O$, 736 g $Al(NO_3)_3·9 H_2O$ and 133 g $La(NO_3)_2·6H_2O$ were dissolved in 12 liters of desalinated water and the solution was heated to 60° C. The process was continued as described in example 1.

EXAMPLE 4

4508 g $Fe_2(SO_4)_3$ dehydrated, 157 g $CuSO_4·5H_2O$ and 611 g $MgSO_4·7H_2O$ and 97 g $Ce(SO_4)_2$ were dissolved in 12 liters of desalinated water and the solution heated to 60° C. The process was continued as described in example 1.

EXAMPLE D (COMPARISON)

4508 g $Fe_2(SO_4)_3$ dehydrated and 157 g $CuSO_4·5H_2O$ were dissolved in 12 liters of desalinated water and the solution was heated to 60° C. The process was continued as described in example 1.

EXAMPLE 5

4508 g $Fe_2(SO_4)_3$ dehydrated, 157 g $CuSO_4·5H_2O$, 736 g $Al(NO_3)_3·9 H_2O$ and 144 g $Mn(NO_3)_2·4H_2O$ were dissolved in 12 liters of desalinated water and heated to 60° C. The process was continued as described in example 1.

EXAMPLE 6

4508 g $Fe_2(SO_4)_3$ dehydrated, 157 g $CuSO_4·5H_2O$, and 736 g $Al(NO_3)_3·9H_2O$ were dissolved in 12 liters of desalinated water and the solution was heated to 60° C. It was precipitated as described in example 1 in NaOH. The washed filter cake was impregnated in a mixer with ammonium molybdate solution (60 g $(NH_4)_6MoO_7·4H_2O$ in 200 ml $H_2O$). After impregnation the process was continued as described in example 1.

EXAMPLE 7

1908 g FeOOH was placed in a pan mill. 152 g $Cu(NO_3)_2·3H_2O$, 736 g $Al(NO_3)_3·9H_2O$, 132 g $Ce(NO_3)_3·6H_2O$ and 125 g $Ba(NO_3)_2$ were dissolved in 1.1 liters of desalinated water and heated to 60° C. The salt solution was added to the running pan mill within 5 minutes and ground for another two hours. The still wet mass was dried at 80° C. for 12 hours and screen-granulated over a sieve with a mesh size of 1 mm. The process was continued as described in example 1.

EXAMPLE 8

4508 g $Fe_2(SO_4)_3$ dehydrated, 157 g $CuSO4·5H_2O$, 736 g $Al(NO_3)_3·9H_2O$ and 0.42 g Pd (II)-acetate were dissolved in 12 liters of desalinated water and the solution was heated to 60° C. The process was continued as described in example 1.

Catalysts obtained in this way were subjected to the aforementioned activity test. The following table summarizes results:

TABLE

| Catalyst | X (%) | Cycle 1 | X (%) | Cycle 2 |
|---|---|---|---|---|
| Example | | | | |
| Temperature | 350° | 370° | 350° | 370° |
| 1 | 93 | 92 | 84 | 86 |
| A (Comparison) | 63 | 77 | 58 | 74 |
| B (Comparison) | 69 | 80 | 42 | 55 |
| C (Comparison) | 92 | 93 | 60 | 70 |
| 2 | 93 | 93 | 90 | 91 |
| 3 | 91 | 92 | 64 | 75 |
| 4 | 75 | 82 | 69 | 75 |
| D (Comparison) | 44 | 63 | 41 | 54 |
| 5 | 93 | 93 | 79 | 82 |
| 6 | 91 | 92 | 75 | 78 |
| 7 | 92 | 92 | 87 | 88 |
| 8 | 89 | 90 | 61 | 72 |

As shown by these examples, the catalyst according to the invention as per example 1 which contains both $Al_2O_3$ and also $ZrO_2$ was clearly superior in terms of initial activity to the chromium-containing commercial catalyst (comparison example A) and also the catalysts produced for comparison, which contain either $ZrO_2$ (comparison example B) or $Al_2O_3$ (comparison example C). With regard to thermal stability, it is likewise superior to the comparison catalyst B and C by far and was likewise superior to the chromium-containing commercial comparison catalyst.

With regard to thermal stability another improvement can be achieved with the catalyst according to example 2 in which the $ZrO_2$ was replaced by $Ce_2O_3$. If, as described in example 3, instead of $Ce_2O_3$ the oxide of the rare earth metal lanthanum is used, likewise a higher initial activity and a comparable thermal stability as in the commercial comparison catalyst was achieved. Example 4 describes a catalyst in which the base metal aluminum was replaced by magnesium with a cation which has an ionic radius of 66 pm. This catalyst also has much higher initial activity and thermal stability than the comparison catalyst A and B and better thermal stability than comparison catalyst C. The comparison catalyst D consisting of iron oxide and the copper component, before and after thermal aging, has an activity which is unacceptably low compared to the other catalysts. In examples 5 and 6, instead of the oxides of the rare earth metals, Mn or Mo was used. These catalysts in turn have an initial activity which is superior compared to the commercial catalyst. In example 7 a catalyst is described which was produced by impregnation and mechanical mixing based on an alternative iron oxide component. This catalyst admittedly does not reach the activity values of the Ba-free catalyst according to Example 2, however it is superior to the comparison catalysts A, B, and C.

If, as shown in Example 8, instead of the stabilizing components Zr or Ce, a precious metal is used, the catalyst shows a clearly higher initial activity than the commercial catalyst according to comparison example A. Notwithstanding, the thermal stability, however, is not clearly exceeded.

We claim:

1. A chromium-free, high temperature CO shift conversion catalyst for conversion of carbon monoxide with steam into hydrogen and carbon dioxide, comprising the following components in an application form:
   (a) about 30–98% by weight iron oxide, computed as $Fe_2O_3$;
   (b) about 0.1–20% by weight copper oxide, computed as CuO;
   (c) about 0.1–20% by weight of an oxide of a rare earth metal, computed as $Me_2O_3$ or zirconium oxide, computed as $ZrO_2$; and
   (d) about 0.1–30% by weight of at least one oxide of one or more base metals with an ionic radius of about 50 to 72 pm.

2. The catalyst of claim 1 wherein there is also added up to about 0.1% by weight of at least one oxide of one precious metal from the platinum group.

3. The chromium-free catalyst of claim 2 wherein there is also added up to about 30% by weight barium oxide.

4. The catalyst of claim 1 wherein there is also added up to about 30% by weight barium oxide.

5. The catalyst of claims 4 wherein the content of barium oxide (f) is about 0 to 10% by weight.

6. The catalyst of claim 1 wherein the iron oxide content (a) is about 50 to 95% by weight.

7. The catalyst of claim 1 wherein the iron oxide content is about 80 to 95% by weight.

8. The catalyst of claim 1 wherein the copper oxide content (b) is about 0.5 to 10% by weight.

9. The catalyst of claim 1 wherein the copper oxide content is about 1 to 5 % by weight.

10. The catalyst of claim 1 wherein the content of rare earth oxide or zirconium oxide (c) is about 0.1 to 10% by weight.

11. The catalyst of claim 10 wherein the rare earth metal oxide is cerium oxide.

12. The catalyst of claim 1 wherein the content of rare earth oxide or zirconium oxide is 0.5 to 5% by weight.

13. The catalyst of claim 1 wherein the content of the base metal oxide (d) is about 0.2 to 15% by weight.

14. The catalyst of claim 1 wherein the content of the base metal oxide (d) is about 0.5 to 10% by weight.

15. The catalyst of claim 1 wherein the base metal oxide (d) is selected from the group consisting of aluminum oxide, magnesium oxide, manganese oxide and molybdenum oxide.

16. The catalyst of claim 1 wherein it is formed as a molding, in the form of balls, tablets, rings or extruded moldings.

17. The catalyst of claim 16 wherein the extruded moldings are formed as solid or hollow bodies.

18. A process for the production of a chromium free, high temperature CO shift conversion catalyst for conversion of carbon monoxide with steam into hydrogen and carbon dioxide comprising:
   grinding together oxide components in fine particulate form to produce a ground mixture, wherein the oxide components in application form comprise:
      (a) about 30–98% by weight iron oxide, computed as $Fe_2O_3$;
      (b) about 0.1–20% by weight copper oxide, computed as CuO;
      (c) about 0.1–20% by weight of an oxide of a rare earth metal, computed as $Me_2O_3$ in which Me is a rare earth metal or zirconium oxide, computed as $ZrO_2$; and
      (d) about 0.1–30% by weight of at least one oxide of one or more base metals with an ionic radius of about 50 to 72 pm,
   treating the ground mixture at temperatures of about 400° to about 1000° C. and
   compressing the ground mixture into a molding to form the catalyst.

19. The process of claim 18 wherein the oxide components also include up to about 0.1% by weight of at least one oxide of a precious metal selected from the platinum group.

20. The process of claim 18 wherein the oxide components also include up to about 30% by weight barium oxide.

21. The process of claim 18 wherein the oxide components also include up to about 0.1% by weight of at least one oxide of a precious metal selected from the platinum group and up to about 30% by weight barium oxide.

22. A process for the production of a chromium-free, high temperature CO shift reaction catalyst for conversion of carbon monoxide with steam into hydrogen and carbon dioxide comprising:
   grinding together precursors of oxide components to produce a around mixture, wherein the oxide components in application form comprise:
      (a) about 30–98% by weight iron oxide, computed as $Fe_2O_3$;
      (b) about 0.1–20% by weight copper oxide, computed as CuO;
      (c) about 0.1–20% by weight of an oxide of a rare earth metal, computed as $Me_2O_3$ in which Me is a rare earth metal or zirconium oxide, computed as $ZrO_2$; and
      (d) about 0.1–30% by weight of at least one oxide of one or more base metals with an ionic radius of about 50 to 72 pm, other than chromium,
   converting the around mixture into oxides by thermal treatment at a temperature of about 400° to about 1000° C. and
   compressing the mixture into moldings to form the catalyst.

23. The process of claim 22 wherein the components (a) through (d) are selected from the group comprising hydroxides, hydroxycarbonates and carbonates.

24. A process for the production of a chromium-free, high temperature CO shift reaction catalyst for conversion of carbon monoxide with steam into hydrogen and carbon dioxide comprising:

separating precursors of oxide components from solution of their salts by joint or sequential precipitation in the form of insoluble precipitates, wherein the oxides comprise in application form
(a) about 30–98% by weight iron oxide, computed as $Fe_2O_3$;
(b) about 0.1–20% by weight copper oxide, computed as CuO;
(c) about 0.1–20% by weight of an oxide of a rare earth metal, computed as $Me_2O$, in which Me is a rare earth metal or zirconium oxide, computed as $ZrO_2$; and
(d) about 0.1–30% by weight of at least one oxide of one or more base metals with an ionic radius of about 50 to 72 pm other than chromium, and thermally treating the insoluble precipitates for purposes of conversion at temperatures of about 400° to about 1000° C.

25. The process of claim 24 wherein the oxide catalyst also includes as a component up to about 0.1% by weight of at least one oxide of a precious metal from the platinum group and up to about 30% by weight barium oxide.

26. A process for the production of a chromium-free, high temperature CO shift reaction catalyst for conversion of carbon monoxide with steam into hydrogen and carbon dioxide comprising impregnating an iron oxide component, computed as $Fe_2O_3$ with a solution of salts of the following oxides:
(a) about 0.1–20% by weight copper oxide, computed as CuO;
(b) about 0.1–20% by weight of an oxide of a rare earth metal, computed as $Me_2O_3$ (in which Me is a rare earth metal, or zirconium oxide, computed as $ZrO_2$; and
(c) about 0.1–30% by weight of at least one oxide of one or more base metals with an ionic radius of about 50 to 72 pm other than chromium to form a mixture, wherein the iron oxide component comprises about 30–98% by weight of the mixture and converting the mixture into a combination of corresponding oxides by thermal treatment at temperatures of about 400° to 1000° C.

27. The process of claim 26 wherein the oxide components also include as a component up to about 0.1% by weight of at least one oxide of a precious metal from the platinum group and up to about 30% by weight barium oxide.

28. The process of claim 26, wherein iron (II) and iron (III) compounds or mixtures thereof are used as the iron oxide component.

29. The process of claim 26 wherein goethite is used as the iron oxide component.

30. A process for the conversion of carbon monoxide with steam into hydrogen and carbon dioxide using a chromium-free, high temperature CO shift conversion catalyst comprising preparing the chromium-free high temperature CO shift conversion catalyst from the following components:
(a) about 30–98% by weight iron oxide, computed as $Fe_2O_3$;
(b) about 0.1–20% by weight copper oxide, computed as CuO;
(c) about 0.1–20% by weight of an oxide of a rare earth metal, computed as $Me_2O_3$ in which Me is a rare earth metal or zirconium oxide, computed as $ZrO_2$; and
(d) about 0.1–30% by weight of at least one oxide of one or more base metals with an ionic radius of about 50 to 72 pm other than chromium and processing the carbon monoxide with steam in a feed stream at high temperatures to produce hydrogen and carbon dioxide.

31. The process of claim 30 wherein there is included as an additional component in the catalyst up to about 0.1% by weight of at least one oxide of a precious metal from the platinum group.

32. The process of claim 30 wherein the conversion of carbon monoxide occurs at a temperature of about 200° to 600° C. and at pressures of about 1 to 150 bar.

33. The process of claim 30 wherein the conversion occurs at a temperature above about 300° C.

34. The process of claim 30 wherein there is included as an additional component in the catalyst up to about 30% by weight barium oxide.

* * * * *